(12) United States Patent
Poppe et al.

(10) Patent No.: US 7,201,185 B2
(45) Date of Patent: Apr. 10, 2007

(54) COUPLED DRIVE MULTI-POSITION FLUID VALVE APPARATUS AND METHOD

(75) Inventors: Carl H. Poppe, Sebastopol, CA (US); Carl M. Servin, Rohnert Park, CA (US); Jon A. Nichols, Forestville, CA (US); Michael R. Straka, Middletown, CA (US)

(73) Assignee: Rheodyne LLC, Rohnert Park, CA (US)

( * ) Notice: Subject to any disclaimer, the term of this patent is extended or adjusted under 35 U.S.C. 154(b) by 0 days.

(21) Appl. No.: 11/057,395

(22) Filed: Feb. 11, 2005

(65) Prior Publication Data
US 2005/0199304 A1    Sep. 15, 2005

Related U.S. Application Data

(60) Provisional application No. 60/544,870, filed on Feb. 13, 2004.

(51) Int. Cl.
*F16K 31/02* (2006.01)
(52) U.S. Cl. ..................... 137/554; 137/269
(58) Field of Classification Search ........... 137/269, 137/884, 614.17, 512.1, 512.3, 554
See application file for complete search history.

(56) References Cited

U.S. PATENT DOCUMENTS

| | | | |
|---|---|---|---|
| 4,621,789 A * | 11/1986 | Fukamachi | 251/129.12 |
| 4,754,949 A | 7/1988 | Fukamachi | |
| 5,098,063 A * | 3/1992 | Ronzon | 137/554 |
| 5,099,867 A * | 3/1992 | Emery | 137/1 |
| 5,226,454 A | 7/1993 | Cabalfin | |
| 5,518,462 A * | 5/1996 | Yach | 475/149 |
| 5,758,684 A * | 6/1998 | Hudson et al. | 137/269 |
| 6,371,440 B1 | 4/2002 | Genga et al. | |
| 6,604,542 B1 * | 8/2003 | Bircann et al. | 137/269 |

(Continued)

FOREIGN PATENT DOCUMENTS

DE    9010608    9/1990

(Continued)

OTHER PUBLICATIONS

PCT/US2005/004598, International Search Report dated May 13, 2005.

(Continued)

*Primary Examiner*—John Fox
(74) *Attorney, Agent, or Firm*—Beyer Weaver LLP

(57) ABSTRACT

A multi-position micro-fluidic valve system that includes an actuator assembly with a housing and a drive shaft rotatably disposed in the housing for rotational displacement about a drive axis thereof. One end of the drive shaft is configured to couple to a drive motor for selective rotation of the drive shaft about the drive axis. One of at least two different multi-position fluid valve devices can be removably mated to the actuator assembly. Each valve device is configured for rotational movement of a corresponding valve shaft about a valve rotational axis thereof between a plurality of discrete fluid distribution positions. A coupling device selectively and removably mounts the valve shaft of the respective valve device to the drive shaft of the actuator assembly. This enables selective positioning of the multi-position fluid valve device at a discrete one of the plurality for discrete distribution positions.

28 Claims, 10 Drawing Sheets

U.S. PATENT DOCUMENTS 6,619,142 B1 * 9/2003 Forster et al. ........... 73/861.74
2002/0084436 A1 7/2002 Rauch et al.

FOREIGN PATENT DOCUMENTS

| DE | 19836042 | 2/2000 |
| EP | 1054199 | 11/2000 |
| WO | WO02/0598513 | 8/2002 |
| WO | WO03/023265 | 3/2003 |

OTHER PUBLICATIONS

PCT/US2005/004598, Written Opinion dated May 13, 2005.

* cited by examiner

COUPLED DRIVE MULTI-POSITION FLUID VALVE APPARATUS AND METHOD

RELATED APPLICATION DATA

The present application claims priority under 35 U.S.C. §119 to U.S. Provisional Application Ser. No. 60/544,870, naming Straka et al. inventors, and filed Feb. 13, 2004, and entitled A MULTI-POSITION VALVE INCORPORATING COUPLED DRIVE, ENCAPSULATED BALL BEARINGS AND IDENTIFIABLE, REPLACEABLE LIQUID ENDS, the entirety of which is incorporated herein by reference in its entirety for all purposes.

TECHNICAL FIELD

The present invention relates to multi-position valves, and more particularly, relates to coupled drive multi-position valves for micro-fluidic distribution management.

BACKGROUND ART

Dual and multi-position valves to inject, select or switch fluids are well established in scientific instrumentation. Numerous manufacturers around the world produce many products to satisfy customer needs related to precision of liquid dispensed or injected.

While many products exist, none have been able to combine an engineered plastic version of a field replaceable high pressure or low pressure liquid end that is able to operate for >100,000 actuations without maintenance while maintaining critical alignment of the internal conduits.

DISCLOSURE OF INVENTION

The present invention provides a multi-position micro-fluidic valve system incorporating an interchangeable a high torque, multi-position valve device that can be applied to various forms of fluid management. Briefly, the valve system is motor driven and utilizes a planetary gear reduction gear train, either single or dual reduction. The system is capable of resolving multiple valve position (equally spaced) porting scenarios with absolute position feedback utilizing custom designed encoder wheels and optical sensors. A drive assembly of an actuator assembly is composed of primarily engineered composites (injection molded) to reduce cost and increase actuator life. The actuator assembly drives a stainless steel valve device, which is a high strength seal enclosure that can be easily removed without tools from the drive assembly for repairs and/or maintenance. The actuator assembly is designed to be able to accept different valve devices if the customer so desires to change the liquid end sometime in the future. For example, one multi-position fluid valve device could be 6-position rotary valve, and another multi-position valve device could be a 10-position rotary valve, both of which can be mounted to the same actuator assembly.

More particularly, the multi-position micro-fluidic valve system includes an actuator assembly with a housing and a drive shaft rotatably disposed in the housing for rotational displacement about a drive axis thereof. One end of the drive shaft is configured to couple to a drive motor for selective rotation of the drive shaft about the drive axis. One of at least two different multi-position fluid valve devices can be removably mated to the actuator assembly. Each valve device is configured for rotational movement of a corresponding valve shaft about a valve rotational axis thereof between a plurality of discrete fluid distribution positions. A coupling device selectively and removably mounts the valve shaft of the respective valve device to the drive shaft of the actuator assembly. This enables selective positioning of the multi-position fluid valve device at a discrete one of the plurality for discrete distribution positions.

Accordingly, the present invention provides a micro-fluidic switching platform that enables interchangeability of multiple valve devices, each of which renders a different liquid end. Hence, by identifying which particular valve device is currently installed, the valve device can be controlled and operated accordingly, using the same actuator assembly.

In one specific embodiment, a sensor assembly cooperates with one of the drive shaft and the valve shaft to effect alignment of the respective valve device in a discrete one position of the plurality of positions thereof. The sensor assembly includes one or more encoder wheels strategically coupled to the drive shaft for rotation thereof about the drive axis. The sensor assembly includes one or more sensors that cooperate with the one or more encoder wheels, relative the drive shaft, to position the respective valve device in the discrete one position of the plurality of positions thereof.

In another specific embodiment, the housing includes a first bearing race portion that defines a central passage therethrough. The actuator assembly further includes an encoder spool disposed in the housing. The spool includes a second bearing race portion oriented opposite the first bearing race portion of the housing when the spool is operably mounted. The encoder spool further defines a central port formed and dimensioned for friction fit receipt of the drive shaft therethrough. The fit is designed such that when the carrier platform is positioned on an opposite side of the first bearing race portion of the housing, and the drive shaft is friction fit to the encoder spool, the first bearing race portion is sandwiched between the second bearing race portion of the encoder spool and the carrier platform of the drive shaft to provided rotational support of the drive shaft relative the housing. A plurality of ball bearings is disposed between the first bearing race portion of housing and the second bearing race portion of the encoder spool to facilitate the rotational support.

Further, to facilitate mounting of the drive shaft to the encoder spool, the drive shaft includes a plurality of splines extending generally radially outward from the drive axis. The central port of the encoder spool is formed and dimensioned for sliding frictional receipt of the drive shaft axially therethrough such that a distal end thereof protrudes into a receiving socket of the encoder spool.

In yet another specific configuration, a sensor assembly is included that cooperates with the drive shaft of the actuator assembly to enable absolute positioning of the respective valve device in a discrete one position of the plurality of positions thereof. The sensor assembly includes one or more encoder wheels strategically mounted to the encoder spool for rotation thereof about the drive axis.

In still another embodiment, the respective coupling device includes a coupler member strategically affixed to the valve shaft of the corresponding valve device for rotation about the valve rotation axis. The coupling device defines a receiving slot formed and dimensioned for sliding frictional receipt of the plurality of splines of the drive shaft axially therein. The coupler member is formed and dimensioned for sliding receipt in the receiving socket of the encoder spool when the drive shaft is received in the receiving slot of the coupler member.

In order to assure proper component alignment during mounting of the valve device to the actuator assembly, a coupler key mechanism cooperates between the coupler member and the encoder spool. This key mechanism aligns the orientation of the coupler member relative the encoder spool. Further, a valve key mechanism is provided that cooperates between the valve device and the actuator assembly for aligned orientation of the valve device relative the actuator assembly.

In another embodiment of the present invention, a valve identification device is included to identify of the type of valve device that is removably mounted to the actuator assembly. That is, when a valve device is mounted to the actuator assembly, the identification device will be able to determine, for instance, whether the valve is a four position valve, a six position valve, or a ten position valve, etc. In one configuration, the valve sensing device includes RFID technology.

In another aspect of the present invention, a micro-fluidic valve actuator assembly is configured to removably mate to one of at least two different multi-position micro-fluidic valve devices. Each valve device includes a coupler member for mounting operation of the respective valve device for displacement about a position axis to operably switch the one valve device to a discrete one position of the plurality of positions thereof. The actuator assembly includes a drive motor, and a housing defining a central through-chamber. The housing includes a first bearing race portion extending into the through-chamber and forming a central passage portion thereof. A drive assembly includes a drive shaft with a distal end thereof configured to removably mate with the coupler member of the valve device for operable displacement about the position axis. An opposite proximal portion of the drive shaft includes a carrier platform that is configured to operably couple to the drive motor to rotatably drive the drive assembly about a drive axis. The actuator assembly further includes a plurality of ball bearing disposed in the first bearing race portion of the housing; and an encoder spool disposed in the through-chamber, and including a second bearing race portion oriented opposite the first bearing race portion. This diametrically opposed configuration sandwiches the plurality of ball bearings therebetween, and the encoder spool defines a central port that is formed and dimensioned for friction fit receipt of the drive shaft therethrough. When the carrier platform is positioned on an opposite side of the first bearing race portion of the housing and the drive shaft is friction fit to the encoder spool, the first bearing race portion is sandwiched between the second bearing race portion of the encoder spool and the carrier platform of the drive shaft to provide rotational support of the drive shaft and the encoder spool relative the housing.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

BEST MODE OF CARRYING OUT THE INVENTION

Figure 1:
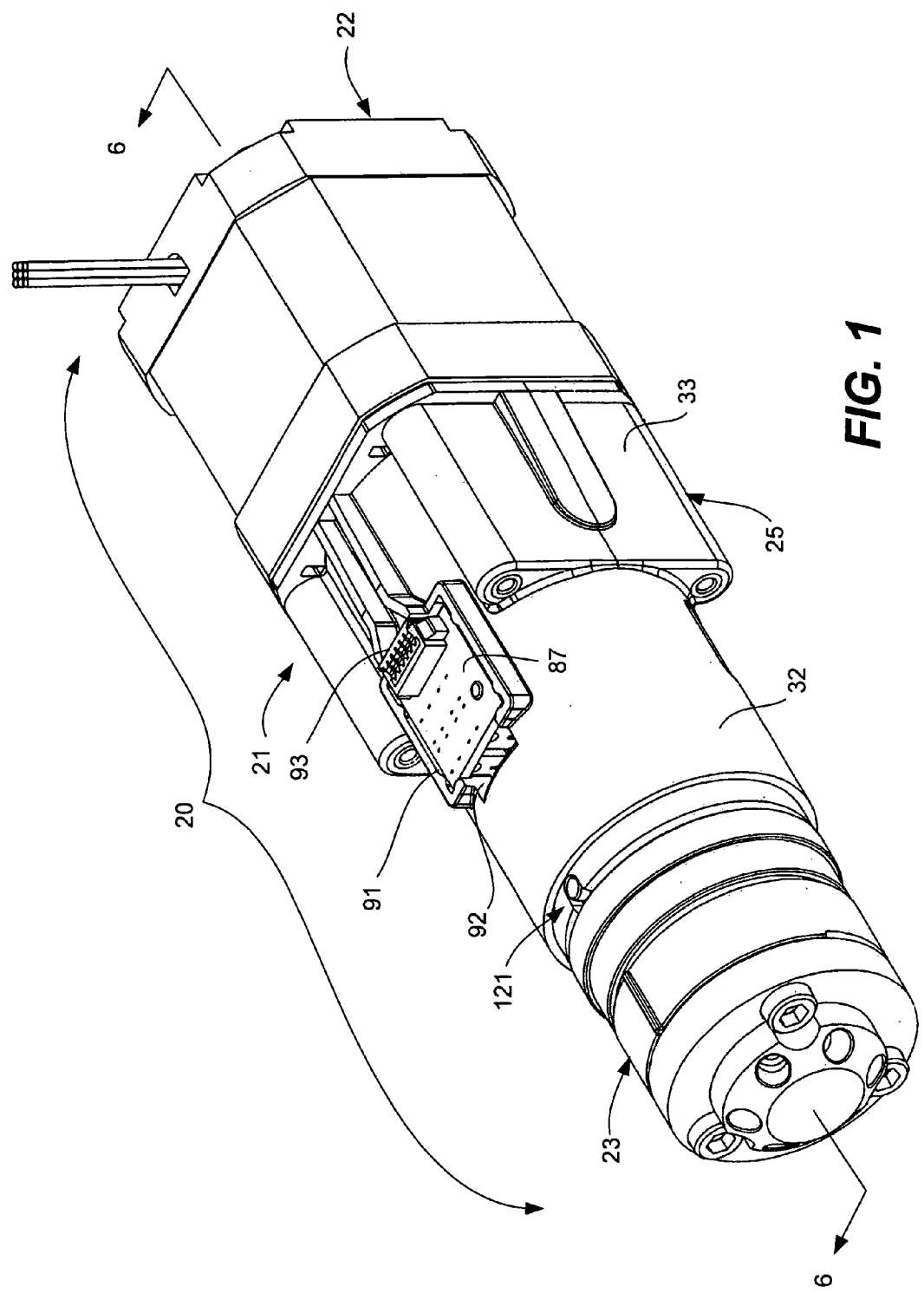
FIG. 1 is a top perspective view of a micro-fluidic valve system constructed in accordance with the present invention.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now generally to FIGS. 1–4 and 11, a multi-position micro-fluidic valve system, generally designated 20, is illustrated including an actuator assembly 21 that couples to a drive motor 22 on one portion thereof, and removably accepts one of at least two different multi-position fluid valve devices 23. The actuator assembly includes a housing 25 and a drive assembly 26 rotatably disposed in the housing 25 for rotational displacement of a drive shaft 27 about a drive axis 28 thereof. One end of the drive shaft 27 is configured to couple to the drive motor 22 for selective rotation of the drive shaft 27 about the drive axis 28. The multi-position fluid valve device 23 that is removably mounted to the actuator assembly 21 includes a corresponding valve shaft 30 that is configured for rotational movement about a valve rotational axis 31 thereof between a plurality of discrete fluid distribution positions. The system further includes a coupling device, generally designated 32, that is configured to selectively, removably mount the valve shaft 30 of the valve device 23 to the drive shaft 27 of the actuator assembly 21 to enable selective positioning of the multi-position fluid valve device 23 at a discrete one of the plurality for discrete distribution positions.

Accordingly, a micro-fluidic valve system is provided that enables one or more multi-position valves to be removably mounted to a single actuator assembly each of which function as entirely different reconfigured liquid end systems. Unlike the current valve systems, for example, a six-position micro-fluidic valve system may be reconfigured into an eight-position micro-fluidic valve system or even a fifteen-position micro-fluidic valve system, which is operated and controlled by the same actuator assembly. As will be described in greater detail below, once the selected valve is aligned and mounted to the actuator assembly, and once the valve device is identified, the reconfigured valve system can be operated to control more than one type of multi-position micro-fluidic valves. Moreover, in situations where a valve device requires repair and/or replacement, the valve can be easily removed for repair or replacement rather than requiring the removal of the entire valve system affixed in the analysis instrument. Consequently, the micro-fluidic valve system is much more versatile, and even results in significant cost reductions due in part to a reduced number of overall components.

Figure 4:
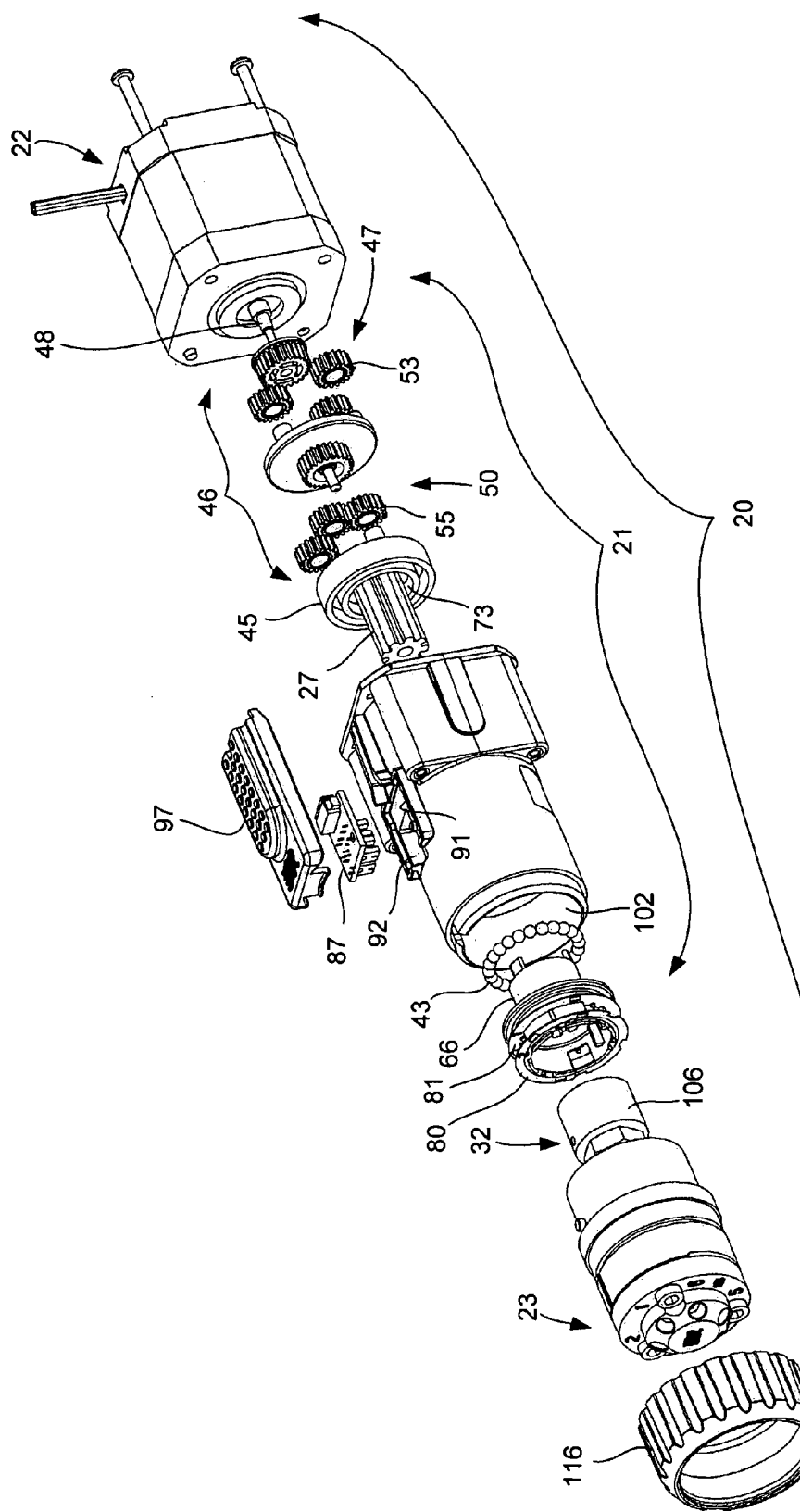
FIG. 4 is a complete exploded top perspective view of the micro-fluidic valve system of FIG. 2.
Figure 5:
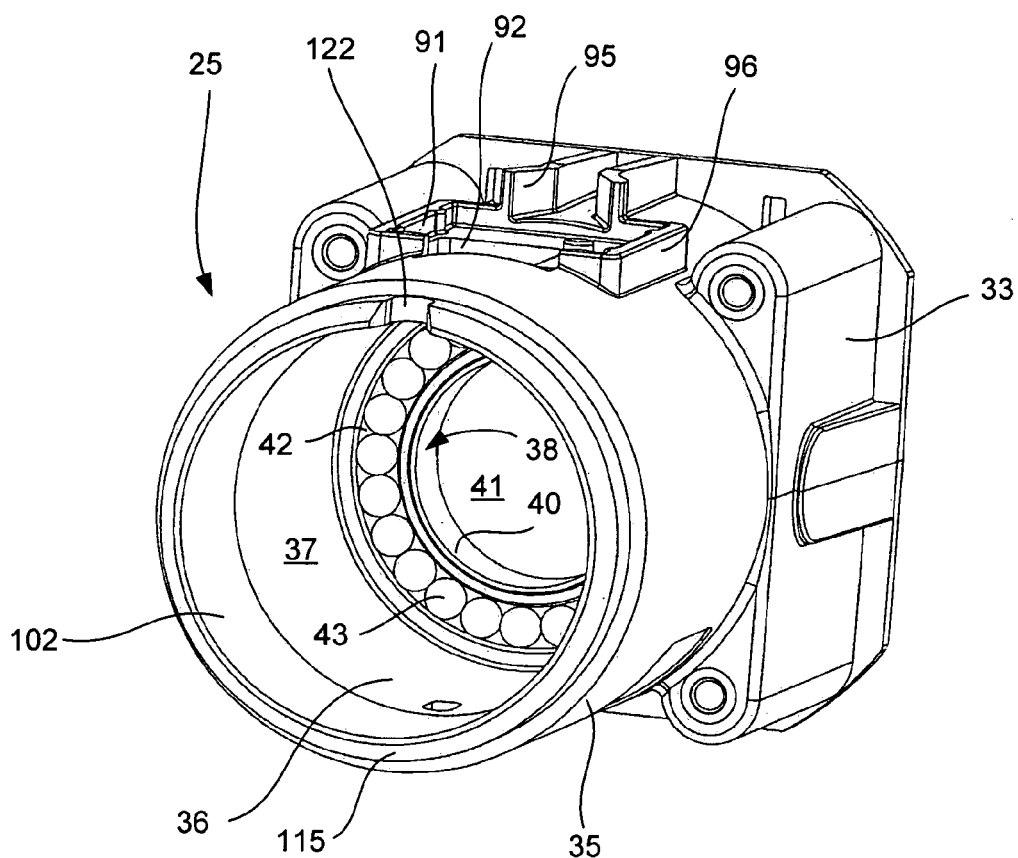
FIG. 5 is an enlarged front perspective view of an actuator housing of the actuator assembly of FIG. 2, illustrating seating of a plurality of ball bearings therein.
Figure 6:
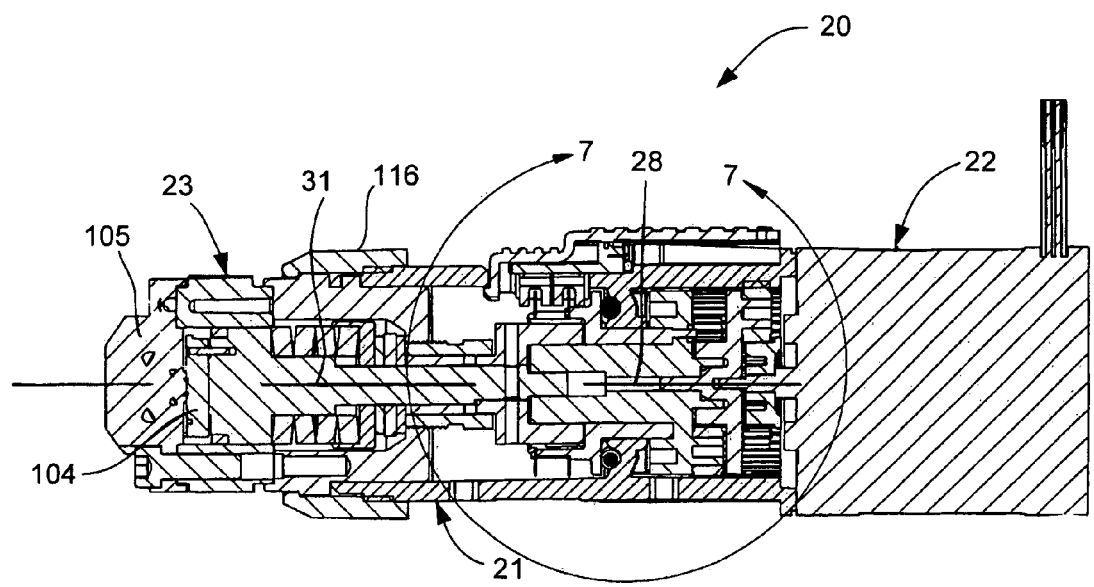
FIG. 6 is a side elevation view, in cross-section, of the micro-fluidic valve system, taken along the plane of the line 6—6 of FIG. 1.

Referring now to FIGS. 4–6, the actuator assembly 21 is shown comprising a housing 25 having a rectangular-shaped proximal portion 33 that mounts to the drive motor 22, and a cylindrical-shaped distal barrel portion 35 that removably mounts to the valve device 23. The housing is generally provided by a shell structure that is preferably composed of a relatively rigid composite material designed for high strength, as will be described in greater detail below.

An interior wall 36 of the housing 25 defines a central through-chamber 37 that extends axially through the housing from the proximal portion 33 to the distal barrel portion 35. Near the center of the through-chamber, an annular bearing structure 38 extends radially inward from the interior wall 36. The bearing structure 38 includes an interior annular bearing wall 40 forming a central passage 41, and a first bearing race portion 42 on the distal side of the bearing structure. As best viewed in FIGS. 5 and 7, the annular first bearing race portion 42 is positioned about the drive axis 28 and is generally semi-donut shaped. As will also be described in greater detail below, a plurality of ball bearings 43 is disposed in the first bearing race portion 42 that cooperate with the annular bearing wall 40 to provide rolling support of the drive assembly 26 about the drive axis.

The drive assembly 26 includes the drive shaft 27 and a gear carrier platform 45 disposed at a proximal end of the drive shaft 27. The drive shaft is essentially an elongated spline shaft having a plurality of splines 44 extending radially outward from the shaft axis thereof. The gear carrier platform 45, on the other hand, is generally disk-shaped and is affixed to the drive shaft in a manner such the carrier platform and the drive shaft 27 are substantially co-axial along the drive axis 28, and function together as a single unit. When the drive assembly 26 is assembled in the housing 25, the carrier platform 45 communicates with a gear train assembly 46, which in turn mates to the drive motor 22 that drives the drive shaft 27.

Figure 7:
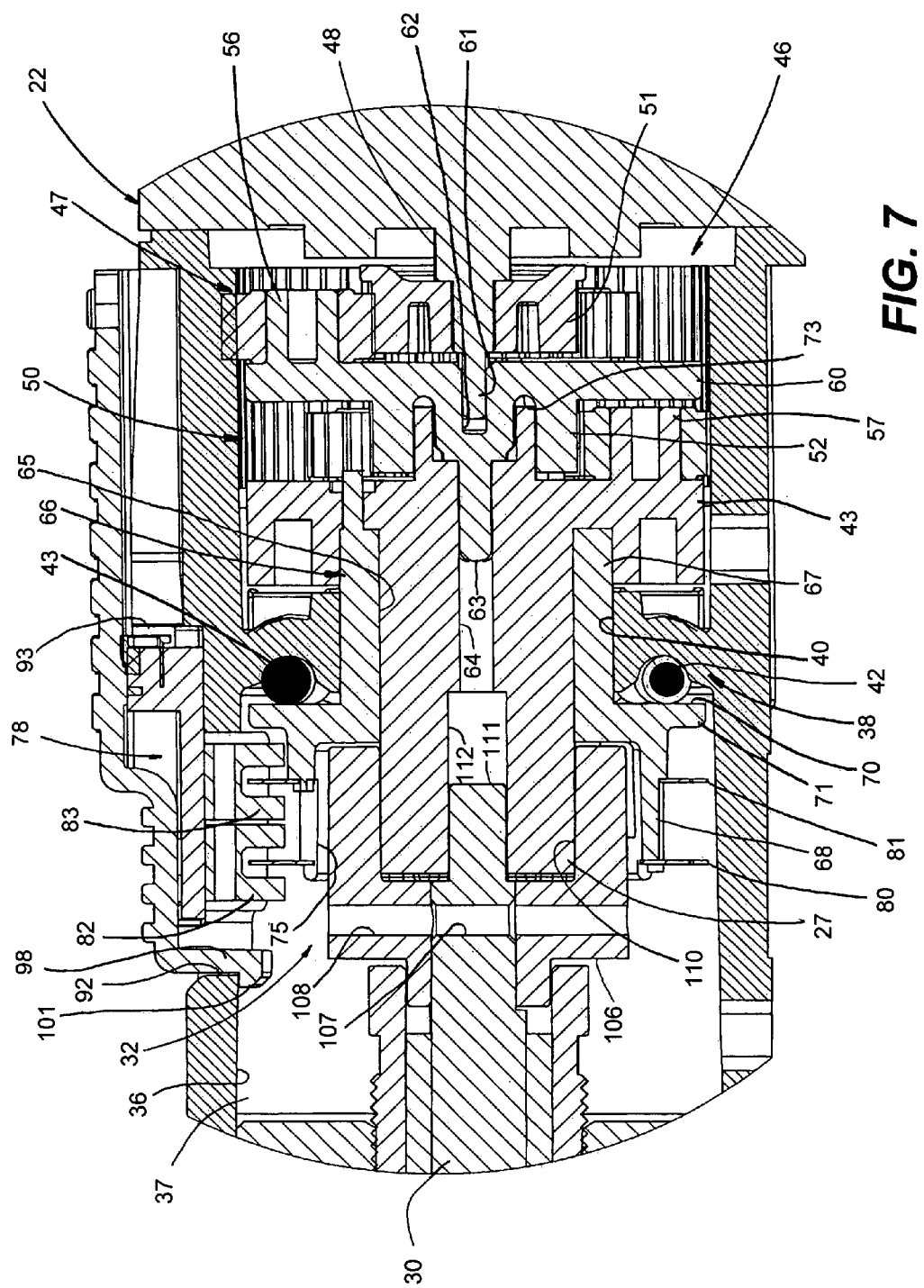
FIG. 7 is an enlarged side elevation view, in cross-section, of the micro-fluidic valve system, taken along the line of the circle 7—7 of FIG. 6.
Figure 9:
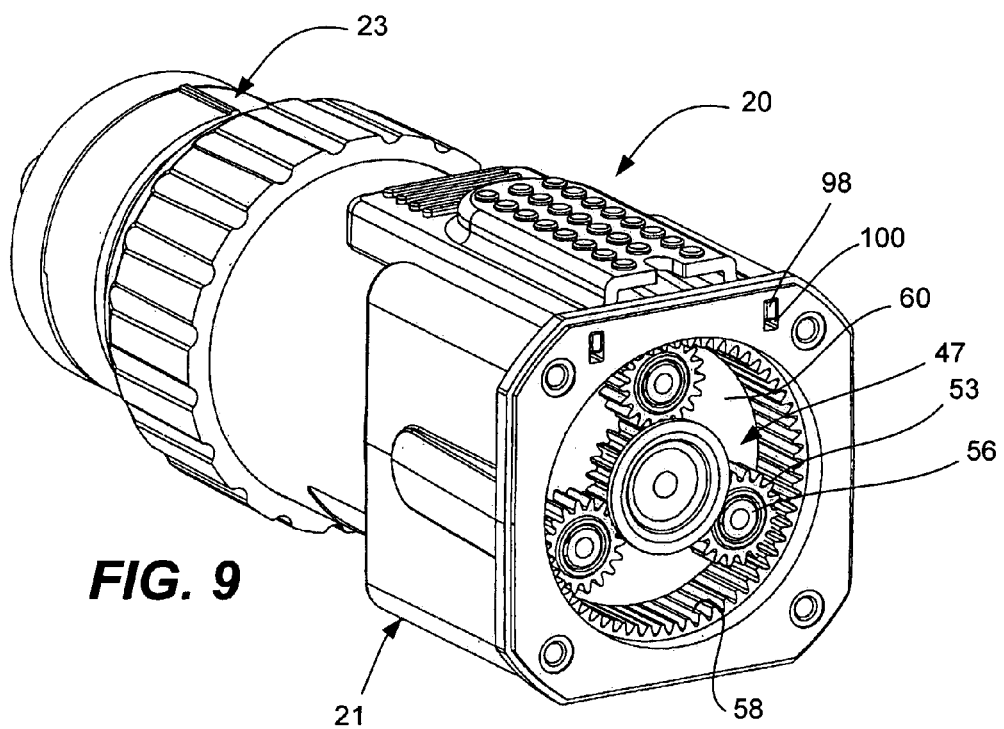
FIG. 9 is a rear perspective view of the actuator assembly of FIG. 8, illustrating a drive train of the valve system.

In one embodiment, as shown in FIGS. 4, 7 and 9, the gear train assembly 46 includes at least one gear reduction drive 47 which in turn is coupled to a shaft 48 of the drive motor 22. Depending upon the speed of the drive motor and/or the desired rotational actuation speed of the valve device, a single reduction gear train may be sufficient. In other embodiments where a high torque, high-speed drive motor 22 is employed, a second gear reduction drive 50 may be placed in series with the first gear reduction drive 47. By way of example, the drive motor may be provided by a stepped, electric motor such as those manufactured by Applied Motion Products, Inc., of Watsonville, Calif., model no. HT17-168.

Whether a one-reduction drive or a two-reduction drive (as illustrated) is employed, each drive essentially functions in the same conventional manner. Briefly, each reduction drive 47, 50 include a pinion gear 51, 52 surrounded by a set of planetary gears 53, 55. Each planetary gear is rotatably mounted to respective posts 56, 57 of the gear carrier platform 45 (FIG. 7 and 8) and an intermediary carrier platform 60 (FIGS. 7 and 9). Similarly, each carrier platform is suspended and supported in the actuator housing by the planetary gears in a manner rotating them about the drive axis 28. As best viewed in FIG. 9, for example, each planetary gear 53 is oriented to engage the teeth of the motor pinion gear 51 and the teeth of an internal ring gear 58 that is integrated into the interior wall 36 of the housing near the proximal portion thereof.

Accordingly, as the motor shaft 48 and motor pinion gear 51 rotates about the drive axis 28, the planetary gears 53 of the first reduction drive 47 cause rotation of the intermediate carrier platform 60, via posts 56. In turn, this causes the second pinion gear 52, fixedly mounted to the intermediary carrier platform 60, to rotate. Similar to the first reduction drive 47, the planetary gears 55 of the second reduction drive 50 cause rotation of the gear carrier platform 45, via posts 57, about the drive axis 28. Collectively, these gear trains reductions cooperate to actuate the mounted valve device at the desired speed.

Figure 8:
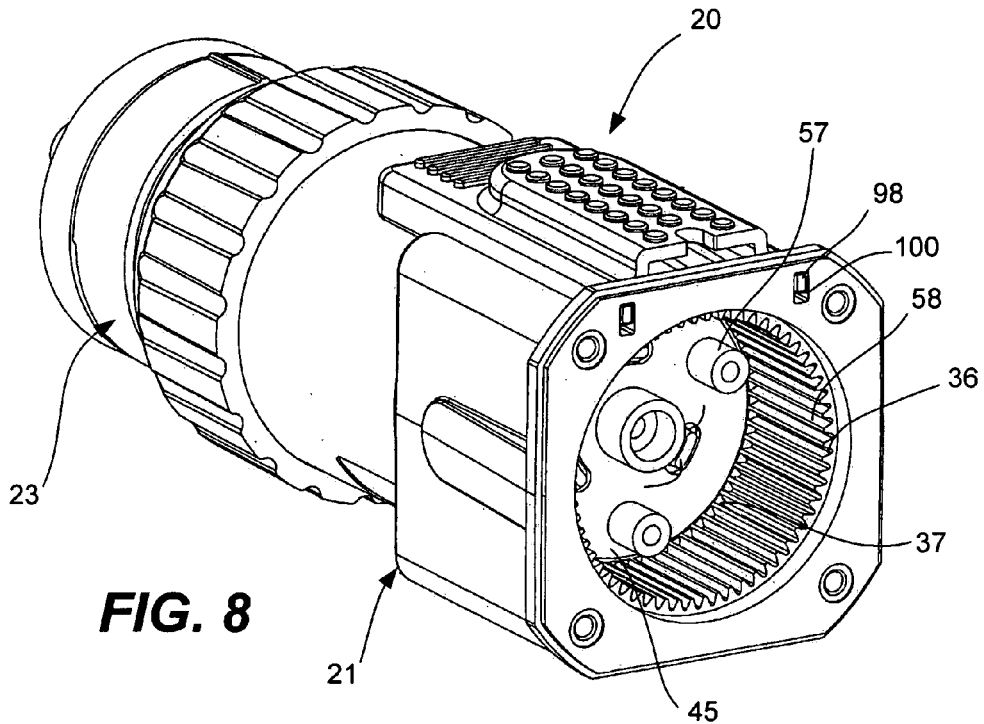
FIG. 8 is a rear perspective view of the actuator assembly of the micro-fluidic valve system of FIG. 1, illustrating a gear carrier platform of a drive assembly mounted in the actuator housing of the valve system.

To facilitate centering of the drive train components about the drive axis 28, when assembled, both the motor shaft 48 and intermediary carrier platform 60 mate with the adjacent gear carrier platform 45, respectively. FIG. 7 best shows that the motor shaft 48 includes a distal finger portion 61 that slideably inserts into an axial slot 62 of the intermediary carrier platform 60 in axial alignment with the drive axis 28. Similarly, the intermediary carrier includes a stepped alignment post 63 that slideably inserts into a corresponding alignment slot 64 on the proximal surface of the gear carrier platform 45 (FIGS. 7 and 8). Once nested together in a mounted relation, the drive train assembly rotates these components in an aligned manner about the drive axis.

Turning now to FIGS. 4, 5, 6 and 7, when the drive assembly 26 is disposed in the through-chamber 37 of the actuator assembly 21, the elongated, splined drive shaft 27 protrudes through the central passage 41 defined by the annular bearing wall 40 of the bearing structure 38. As will be described in greater detail below, the splined drive shaft also concentrically extends through a central port 65 of an encoder spool 66 which itself extends through the bearing central passage as part of the drive assembly 26. Briefly, the engagement between the spline shaft 27 and the encoder spool is, in part, a friction mounting that forms a single unit rotating about the drive axis.

The encoder spool 66 includes a body having a cylindrical-shaped proximal barrel section 67, and a larger diameter cylindrical-shaped distal barrel section 68 (FIGS. 4, 5, 7 and 10). The proximal barrel section 67 has an outer diameter formed and dimensioned for sliding receipt through the central passage 41 defined by the annular bearing wall 40 of the bearing structure 38. The clearance between the annular bearing wall 40 and the outer wall of the proximal barrel section 67 is on the order of about 0.00025 inches to about 0.00075 inches which is sufficient to enable unencumbered rotation of the encoder spool 66 about the drive axis 28. At the same time, the spine shaft 27 extends through the central port 65 of the encoder spool 66 so that the bearing structure 38 of the actuator housing and bearings 42 is sandwiched between the encoder spool 66 and the drive carrier 45. Hence, the bearing wall 40 of the bearing structure 38 essentially functions as a bearing support for the drive assembly 26, once assembled.

Figure 12:
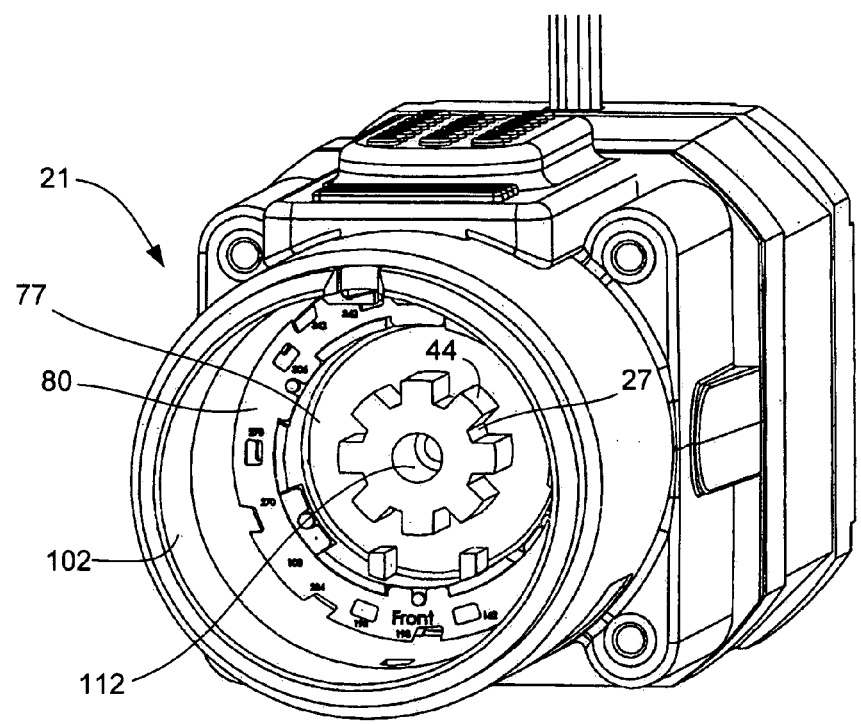
FIG. 12 is a front perspective view of the micro-fluidic valve system of FIG. 1, with the multi-position valve device removed.
Figure 11:
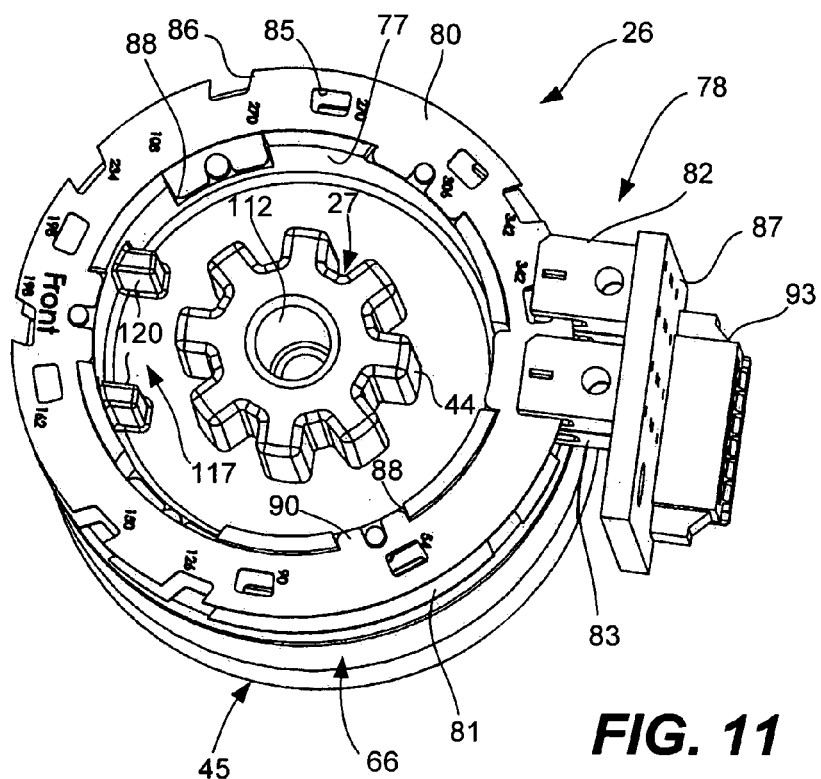
FIG. 11 is a front perspective view of the drive assembly and sensor assembly of FIG. 10.

As above-mentioned, the proximal barrel section 67 of the encoder spool 66 includes a central port 65 that is formed and dimensioned for a tight friction fit with the splined drive shaft 27 when mounted to the spool. FIGS. 11 and 12 best illustrates that the interior walls of the proximal barrel section 67 that define the central port 65 are similarly splined, and dimensioned to mesh with the corresponding splines 44 of the drive shaft 27. Accordingly, when assembled, the meshed splines cooperate such that any rotation of the drive assembly 26 will cause the encoder spool 66 to rotate with the drive shaft together as a single unit.

To facilitate rotational support of the mounted spool/drive shaft (i.e., the drive assembly 26) within the through-chamber 37 of the actuator housing 25, a second bearing race portion 70 of the encoder spool 66 is employed which cooperates with the first bearing race portion 42 of the actuator housing 25 to provide the primary rolling support for the drive assembly. In this aspect of the present invention, a proximal portion of a supporting race (i.e., the first bearing race portion 42) is provided by the actuator housing 25, while an opposed distal portion of the supporting race (i.e., the second bearing race portion 70) is provided by the encoder spool 66. Hence, these two opposed race portions cooperate to sandwich the ball bearings 43 therebetween to provide rotational support of the encoder spool, relative the actuator housing 25, about the drive axis 28.

Figure 10:
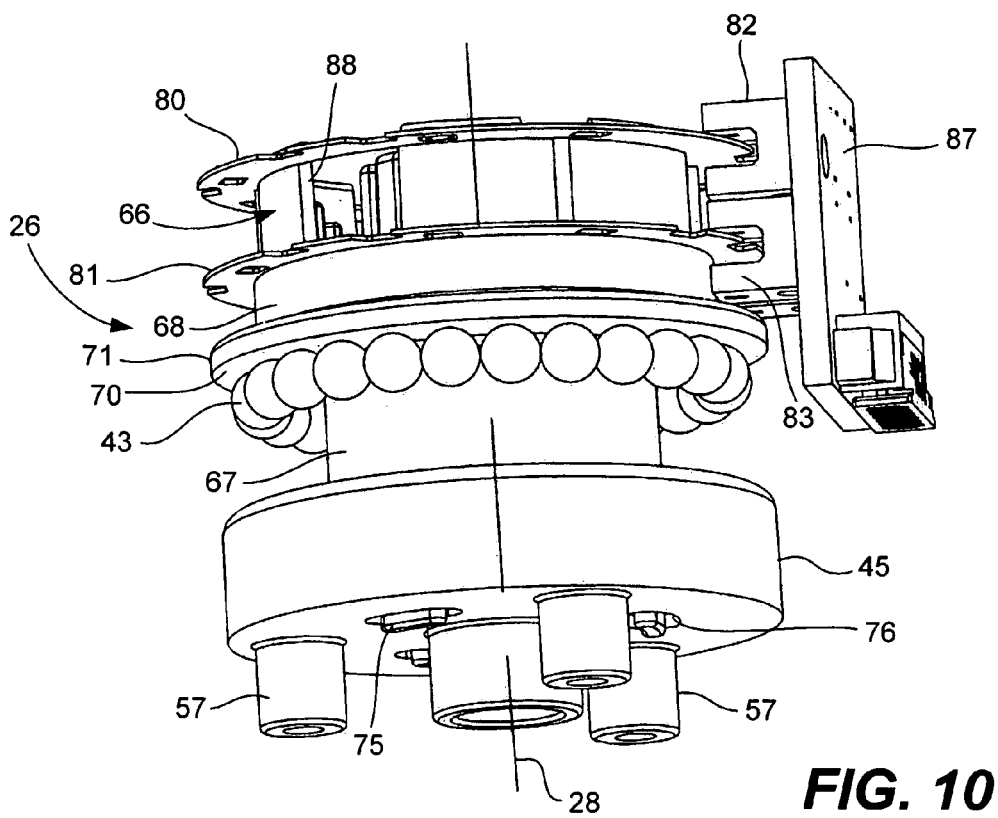
FIG. 10 is an enlarged, rear perspective view of the drive assembly components and the sensor assembly components of the micro-fluidic valve system of FIG. 4.

As shown in FIGS. 4, 7 and 10, the second bearing race portion 70 of the encoder spool 66 is provided by a shoulder portion 71 extending radially beyond the exterior surface of the distal barrel section 68 of the spool. Moreover, the shoulder portion 71 extends over the first bearing race portion 42, and is disposed at the intersection between the adjoined barrel sections of the encoder spool 66. Unlike the first bearing race portion 42, the second bearing race portion 70 is relatively planar in an effort to reduce contact, and thus, friction with the ball bearings therein. As the two diametrically opposed race portions 42, 70 are urged against one another, the ball bearings 43 are contained in rolling support therebetween.

Although the splines of the spool central port 65 are friction fit against and meshed with the splines 44 of the drive shaft 27 when the drive assembly is mounted to the encoder spool 66, a more secured mounting of the encoder spool to the shaft assembly is desired to eliminate any potential backlash and/or component separation issues. This is addressed through an additional friction fit between an annular end of the proximal barrel section 67 of the spool 66 directly into a corresponding annular receiving slot 73 of the gear carrier platform 45 that surrounds the base of the drive shafts (FIGS. 4 and 7).

Moreover, in one specific embodiment, as shown in FIGS. 4, 7 and 10, the annular end of the proximal barrel section 67 includes a plurality of oblong staking nubs 75 that extend axially therefrom. These nubs 75 are aligned with and extend through corresponding receiving apertures 76 in the gear carrier platform that are oriented between the gear posts 57.

The receiving apertures 76 of the gear carrier platform 45 are slightly oversized in the transverse cross-sectional dimension, relative the staking nubs 75. This permits the nubs 75 to slide all the way down into the receiving apertures 76, which further allows the annular end of the proximal barrel section to abut against the bottom of the annular receiving slot 73 of the gear carrier platform 45. At the same time, the splined shaft 27 of the drive assembly is friction fit into the central port 65 of the encoder spool 66 wherein the distal end of the shaft protrudes and extends into a receiving socket 77 defined by the distal barrel section 68 thereof (FIGS. 7, 11 and 12).

To secure and permanently affix the gear carrier platform 45 to the encoder spool 66, the staking nubs 75 are adhered or fastened to the carrier platform. In one specific embodiment, this is performed by ultrasonically welding the staking nubs 75 to the gear carrier platform 45. In effect, the nubs are deformed outwardly, mushrooming the heads of the staking nubs. This causes radial expansion of the nubs 75 radially outward to secure the expanded nubs against the walls of the receiving apertures 76, and thus, affixing the relative axial distances between the encoder spool and the gear carrier platform 45. It will be appreciated, of course, that the encoder spool may be fastened or adhered to the carrier platform by applying many other techniques as well.

In accordance with the present invention, the valve system 20 includes a sensor assembly, generally designated 78, to determine the precise rotational switching position of the mounted valve device 23. Through the precise determination of the switching position, the valve device 23 can be accurately actuated, via the drive motor and the gear train assembly 46, to a discrete one position of the plurality of positions thereof. Accordingly, regardless of which valve device is mounted to the actuator assembly 21, by determining the position of that valve, it can be accurately controlled and positioned.

In one specific embodiment, the sensor assembly 78 includes one or more encoder wheels 80, 81 mounted to the rotating encoder spool 66 that cooperate with corresponding stationary optical sensors 82, 83 to determine the absolute rotational position and orientation of the encoder wheels 80, 81, relative the drive axis 28. As best viewed in FIGS. 10 and 11, using a combination of optical sensors 82, 83 and two encoder wheels 80, 81 that are custom designed to cooperate with one another, multiple position porting scenarios (of the coupled valve device) can be resolved with absolute position feedback.

Figure 14A:
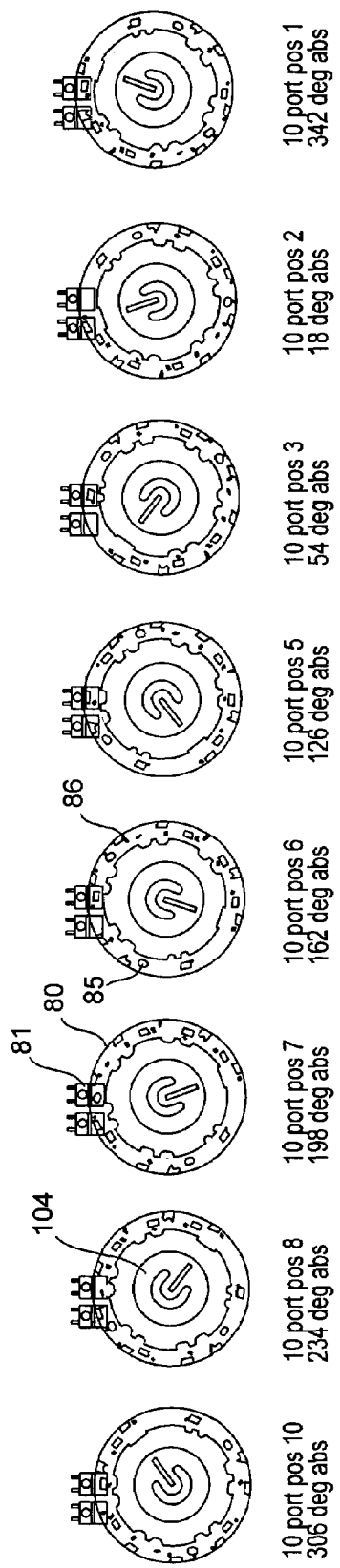
FIGS. 14A and 14B are schematic views of encoder wheels and sensor devices, illustrating the correspondence between a switch position of the valve device and a detected position of the encoder wheel.
Figure 14B:
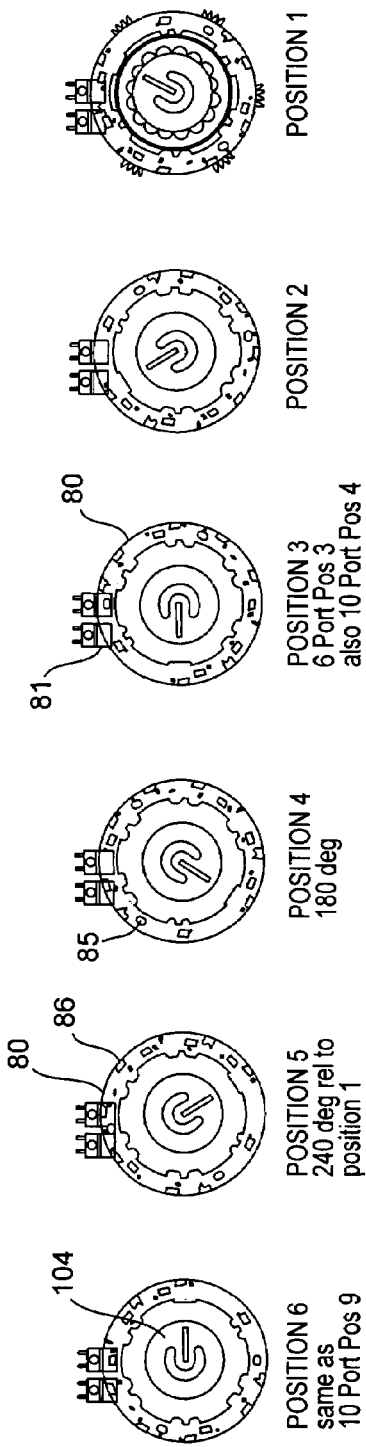

Each encoder wheel 80, 81 contains a set of interior diameter windows 85 and a set of outer diameter notches 86 (FIGS. 12, 14A and 14B) that allows a light signal to be transmitted therethrough. A pair of adjacent sensors 82, 83 mounted to a sensor board 87 straddle the respective rotating wheel in an orientation to determine whether or not a notch or window is sensed. The encoder wheels 80, 81 work in conjunction with the optical sensors 82, 83 to absolutely locate a valve in discrete, equally spaced positions of 36° and 60° increments. Using this approach fifteen combinations are possible for the pair of wheels. Accordingly, a valve device ranging from having two discrete positions to having fifteen discrete positions can be controllably coupled to the actuator assembly for precise control and operation thereof. Moreover, in accordance with the present invention, as will be described in greater detail below, the end user is offered the option of interchanging valve devices ranging from a two position valve to a fifteen position valve (although in most instances, either a 6 position or 10 position valve device) with the same actuator assembly. Thus, the versatility of valve device interchangeability permits the system to be transformed in the field into a completely different product without ever removing the actuator assembly.

In order to strategically position the encoder wheels 80, 81 about the outer diameter of the distal barrel section 68 of the encoder spool 66, the barrel section is custom slotted 88 and configured to receive the corresponding tine portions 90 extending radially inward from the inner wall of the wheel. FIGS. 10 and 11 best illustrate that these axially spaced apart encoder wheels 80, 81 can only be fitted to the distal barrel section 68 of the spool in discrete orientations to assure proper mounting alignment. Using ultrasonic staking, similar to the staking nubs 75 of the proximal barrel section 67, the encoder wheels can be mounted to the distal barrel section.

As above indicated, the dual sets of optical sensors 82, 83 are located on the PC sensor board 87 that is mounted to the actuator housing 25. In one specific embodiment, a board receiving slot 91 in a sidewall of the actuator housing 25 (FIGS. 4, 5 and 7) provides an access port 92 therethrough into the through-chamber 37. This port enables access by the sensors to the two encoder wheels 80, 81 when the drive assembly is operably mounted to the housing. Hence, once the encoder spool/drive assembly is assembled, as mentioned, the PC sensor board can be fitted into the board receiving slot 91 in a manner allowing the sensors to straddle the edge of corresponding encoder wheels 80, 81 (FIG. 7).

To assure that the PCB connector 93 does not inadvertently disengage from the PC sensor board 87 during operation, molded strain-relief stops 95 are provided. These stops 95, working in combination with the retaining walls 96 defining the receiving slot 91, abut the backside of the PCB connector to prevent disengagement. Furthermore, a removable PCB cover 97 is included that covers the backside of the PC sensor board 87 and connector 93 for protection thereof. Using a set of feet 98 on the PCB cover that is received in corresponding slots 100 in the housing, the PCB cover 97 is designed to only be removed when the valve device 23 is not mounted to the actuator assembly 21. Each foot 98 includes an end tab 101 that is only accessible when through a distal opening 102 into the through-chamber 37 when the valve device 23 is not mounted to the actuator housing 25 (FIGS. 7–9).

Figure 3:
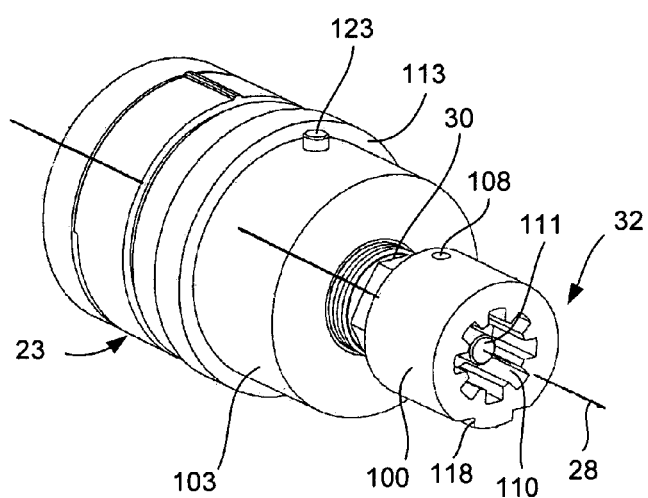
FIG. 3 is an enlarged bottom perspective view of the multi-position valve device of FIG. 2.
Figure 13:
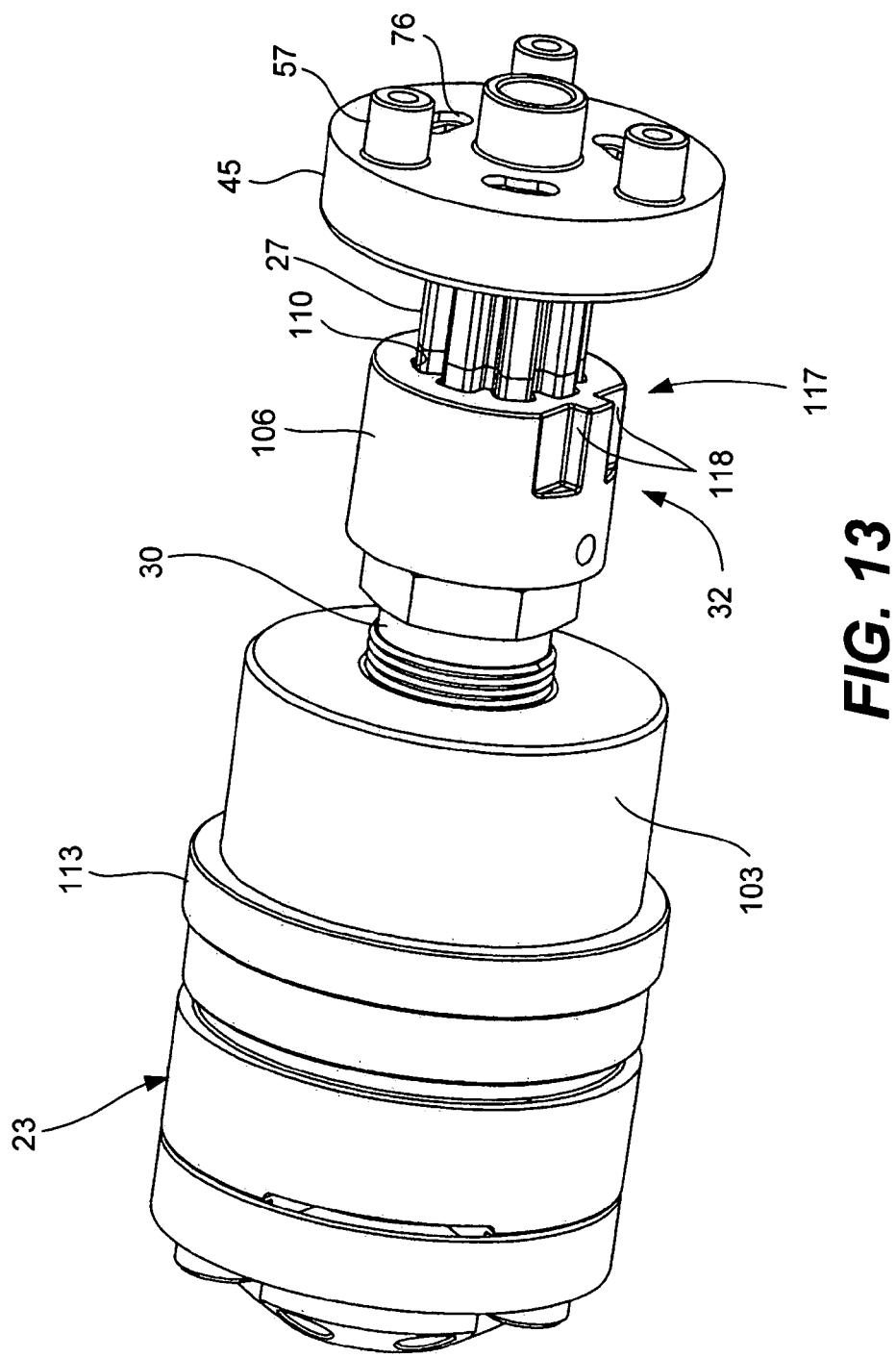
FIG. 13 is a rear perspective view of the multi-position valve device mounted to a drive shaft of the micro-fluidic valve system, via a coupling device.

In accordance with the present invention, more than one multi-position valve device 23 (e.g., a six position valve or a ten position valve) can be coupled to the actuator assembly 21 through a coupling device 32. Referring now to FIGS. 3, 7 and 13, the removable coupling of the valve device 23 to the actuator assembly will be described in greater detail. As shown, the valve device 23 typically includes a cylindrical shaped housing body 103 that contains the multi-position valve components therein. The valve components are preferably provided by a conventional shear face valve with a rotor device 104 and a stator device 105 in fluid-tight contact at an interface plane therebetween (FIG. 6). Briefly, the rotor device 104 is rotatably mounted to the valve shaft 30 about a valve rotational axis 31, and contains a rotor face defining one or more fluid channels. As the rotor face is controllably rotated about the valve rotational axis 31, the one or more fluid channels contained in the face of the rotor device are caused to function as a communication duct or passage between a plurality of fluid ports contained along a stator face of the stator device. In other words, as the rotor face channel is aligned with the corresponding fluid ports on the stator face, fluid communication is enabled between the corresponding fluid ports, via the rotor face channel.

Accordingly, by aligning and mounting the selected valve device 23 to the actuator assembly 21 through a coupling device 32, the switch positioning of the valve device 23 can be precisely controlled through a control unit (not shown) disposed between sensor assembly 78 and the stepped drive motor 22. In essence, this configuration enables precision operation and positioning of the drive shaft 27, via the encoder wheels 80, 81. Hence by determining which multi-position valve device 23 (e.g., a six position or eight position valve) is properly aligned and seated in the actuator housing 25, the control unit can be programmed and operated to correspond to that detected valve so that precision operation for any valve can be realized.

To removably couple the valve device 23 to the actuator assembly 21, the coupling device 32 includes a coupling member 106 strategically oriented and affixed to the end of the valve shaft 30 of the valve device 23 for rotation about the valve rotation axis. FIGS. 3 and 13 best illustrate that the coupling member 106 is substantially cylindrical shaped, and is fixedly mounted to the valve shaft 30 for rotation about the valve rotational axis 31. In one specific example, both the valve shaft 30 and the coupling member 106 include corresponding bores 107, 108 (FIG. 7), respectively, that are formed for sliding or threaded receipt of an mounting pin or screw (not shown) therein. Upon mounting of the pin into the corresponding bores 107, 108, the coupling member 106 is rotationally aligned about the valve rotational axis 31 and will further be oriented axially along the valve shaft 30.

A receiving slot 110 is formed at an end of the coupling member 106 that is formed and dimensioned for sliding friction fit receipt of the distal tip of the drive shaft 27. Similar to the central port 65 of the encoder spool 66, the receiving slot 110 includes provisions for frictional sliding receipt of the splines 44 of the drive shaft 27. To further facilitate co-axial alignment, FIG. 3 best illustrates that the valve shaft 30 includes a distal nipple portion 111 that protrudes axially into the receiving slot 112 of the drive shaft 27. This nipple portion 111 is formed and dimensioned for sliding receipt in a corresponding longitudinal hollow 112 at the distal end of the drive shaft 27 (FIGS. 7, 11, and 12). In a similar manner, during intercoupling between the components of the coupling device 32, the transverse cross-sectional dimension of the receiving socket 77, formed in the distal barrel section 68 of the encoder spool 66, is also formed and dimensioned for sliding receipt of the coupling member therein.

Accordingly, when coupling a selected valve device 23 to the actuator assembly 21, the coupling member 106 is properly aligned and oriented relative the drive shaft 27. During component engagement, the distal tip of the drive shaft 27 is axially inserted into the receiving slot 110 of the coupling member 106 as the valve device 23 is moved axially toward the encoder spool 66 of the actuator assembly 21. Simultaneously, the coupling member 106 is axially received in the receiving socket 77 of the distal barrel section 68. The friction fit engagement of the drive shaft continues in the receiving slot 110 as the nipple portion 111 is received in the receiving hollow 112 (FIG. 7). In this arrangement, thus, once the drive shaft 27 is mated to the valve shaft 30, via the coupling device 32, the drive axis 28 and the valve rotational axis 31, respectively, are oriented substantially co-axial one another. Moreover, the coupling device 32 also provides a very high torsional rigidity so that the valve shaft 30 and the drive shaft 27 effectively function as a single unit.

To reduce any backlash between the splined drive shaft 27 and both the coupling member 106 and the encoder spools, the splines 44 of the drive shaft 27 include a slight taper of about 0.25° to 0.75°, and more preferably about 0.5°, per side forming a wedge that eliminates all backlash when fully assembled, relative the vertical axis. This creates an anti-backlash drive coupling that significantly eliminates any backlash between the coupling member 106 and the drive shaft 27, and between the encoder spool 66 and the drive shaft 27, increasing the precision and accuracy of valve position operation. Effectively, any clearances are substantially eliminated when the valve device is assembled and seated in the housing of the actuator assembly.

Once the coupling member 106 is mounted to the drive shaft, the valve device 23 must be secured to the actuator assembly to prevent relative rotation therebetween during operation. To secure the valve device, it is removably affixed to the housing 25 of the actuator assembly 21. In one specific configuration, at least a portion of the cylindrical-shaped body of the valve device 23 is received in a distal opening 102 (FIGS. 4 and 5) into the through-chamber 37 of the barrel portion 35 of the actuator housing 25. This arrangement further offers lateral support between the valve body 103 and the actuator housing 25 so that any lateral forces acting on either component will not be transmitted to the coupling device or the rotating shafts.

Figure 2:
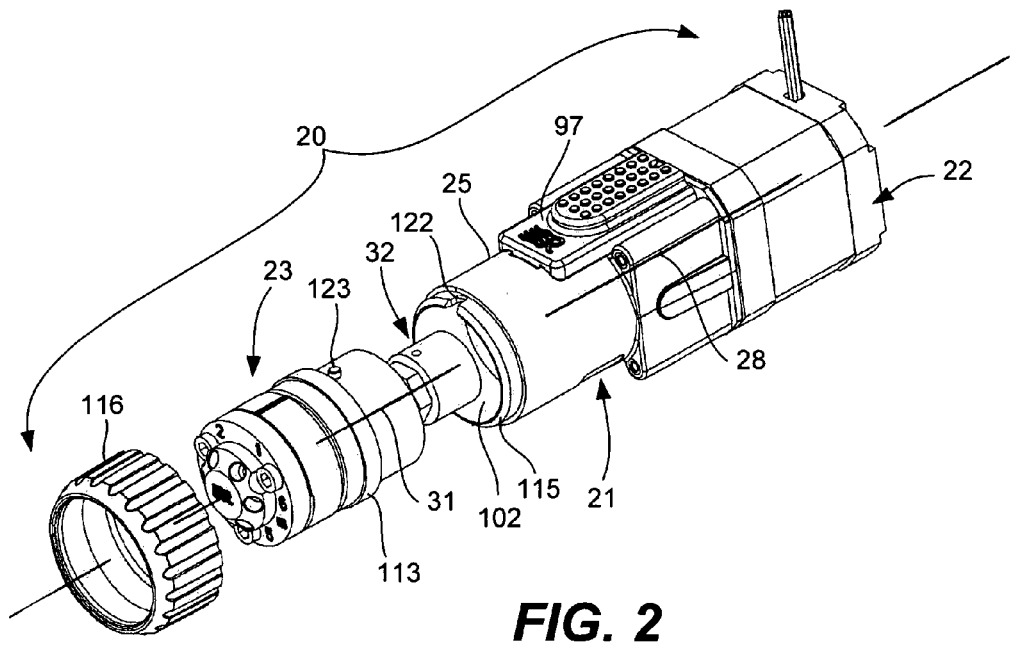
FIG. 2 is a reduced, exploded top perspective view of a multi-position valve device mounted to an actuator assembly of the micro-fluidic valve system of FIG. 1.

As best viewed in FIGS. 1, 2 and 6, as the components of the coupling device 32 interengage, the lower portion of the valve device body 103 is simultaneously slideably received through the distal opening 102 into the through-chamber 37 housing barrel portion 35. An annular shoulder 113 of the valve body 103 protrudes radially outward therefrom which functions to abut against an annular rim 115 of the housing barrel portion 35 to limit receipt therein. This fitment also coincides with the interengagement with the coupling device components with the drive shaft 27.

To completely secure the valve body to the actuator housing, a spanner nut 116 is employed that threadably mounts to the sidewall of the annular rim 115. As the threads of the spanner nut 116 mate with the corresponding threads of the annular rim 115, a lip portion of the spanner nut engages the protruding annular shoulder 113 of the valve body 103, locking the valve device 23 to the actuator assembly 21.

The axial compression of the valve device 23 against the drive assembly 26 provides the further benefit of urging the second bearing race portion 70 of the encoder spool 66 against the ball bearings 43 and the first bearing race portion 42 of the actuator housing. This is imperative since the clearance between the gear carrier platform 45 and the proximal side of the annular bearing structure 38 is only on the order of about 0.01 inch to about 0.02 inch.

During the coupling operation of the valve device 23 to the actuator assembly, it is imperative to properly align the coupling member 106 relative the encoder wheels 80, 81 (hence, the encoder spool 66) for precise and absolute positioning of the channel contained in the face of the rotor device 104. This alignment is performed by providing a coupler key mechanism 117 configured to cooperate between the coupling member 106 and the encoder spool 66 for aligned orientation therebetween. As best illustrated in FIGS. 3 and 13, in one configuration, the coupler key mechanism 117 includes a pair longitudinally extending alignment slots 118 formed in the exterior surface of the coupling member 106. These alignment slots 118 are formed and dimensioned for aligned sliding receipt of a pair of ridges 120 extending into the receiving socket 77 of the distal barrel section 68 of the encoder spool 66 (FIGS. 11 and 12). Accordingly, during mating sliding engagement, the rotor face of the rotor device 104 can be aligned relative the encoder wheels 80, 81 for controlled positioning thereof.

In a like manner, it is also imperative to properly align or position the ports of the stator face of the stator device in order to properly communicate with the channel of the rotor face so that the ports can be selectively connected. Similarly, this alignment is performed by providing a valve key mechanism 121 configured to cooperate between the body 103 of the valve device 23 and the housing 25 of the actuator assembly 21 for aligned orientation of the valve. FIGS. 1–4 best illustrate that the key mechanism 121 is provided by a simple key and slot arrangement. In one embodiment, the annular rim 115 of the housing barrel portion 35 includes longitudinally extending groove 122, while the body 103 of the valve device 23 includes a nub 123 protruding radially therefrom. The annular rim groove 122 is formed and dimensioned for longitudinal sliding receipt of a nub 123 during receipt of the valve body 103 in the distal barrel portion 35 of the actuator housing. This alignment between the valve body 103 and the actuator housing 25 functions to position the ports of the stator device 105 at a known orientation that is selectively accessible by the rotor channel of the rotor device 104.

In another aspect of the present invention, all engaging components of system are composed of materials that eliminate the need for the application of any external lubrication. By incorporating lubricating fillers or encapsulated lubricants into the material compositions of the gear train components, coupling device components and bearing components, a sufficient amount of lubrication is provided that eliminates any maintenance requirements for external lubrication. Hence over the operational life of the system, the maintenance requirements are significantly reduced.

For example, in one specific embodiment, the components of the system can be all, or in part, composed of injection molded high strength engineered composite materials that contain lubricating fillers, such as Polytetrafluoroethylene (PTFE or TEFLON™) or Polyperfluoropolyether (PFPE). By way of example, the ball bearings, gears, couple member, drive shaft and carrier platforms, and encoder spool are all composed of high strength injection molded plastics such as about 30% Glass Filled Nylon which incorporate about 15% PTFE. The ball bearings, in addition incorporate about 1% PFPE. These compositions provide high strength and high torsional rigidity, with very long operational life, while at the same time enabling millions of actuations without the need for any additional external lubrication. Similarly, the actuator housing 25 (in particular the race and bearing portions) are also composed of high strength injection molded plastics, such as about 30% Glass Filled Polyester which incorporate about 15% PTFE.

In still another aspect of the present invention, a valve identification device (not shown) is included to facilitate identification of which type or kind of valve device 23 is removably mounted to the actuator assembly. As previously indicated, the present invention enables two or more different multi-position valve devices to be mounted to the same actuator assembly 21, and still enable precise operation thereof. However, in order to properly operate the mounted valve device, it is imperative to identify which valve device that is currently mounted to the actuator assembly (i.e., whether it is a six position or 10 position, etc. valve).

The identification device may be as simple as a set of markings affixed to the valve devices wherein the operator may then be required to actively select which set of instructions correspond to the above-mentioned control unit (not shown). More preferably, however, the identification is electronically implemented. Currently, two technologies are in wide application, mainly in the retail sector for quickly transferring information. One technique is optical bar coding in a line format that is widely used in UPC product coding and 2D grid patterns to encode more information. The identification technology that is gaining popularity in the retail sector is Radio frequency ID (RFID). RFID is commonly applied in the retail sector to secure merchandise and to passively respond to an RF enquiry or actively (a more complex device with a battery) broadcast information when polled.

In this specific application, these active RFID devices may also be employed to interact with and be programmed by the master controller unit. By mounting a transmitter device to the corresponding valve device, a receiver (reader) device, coupled to the master controller unit, can be employed to read all compatible modules that may mate to the instrument. The master controller must be programmed with a set of instructions that correspond to the ID number that is identified and/or received. In this manner, the system may then automatically configure the control until to the set of operations that correspond to that valve device.

Moreover, such RFID devices may be applied to the system as an information transfer. The capability of an analytical instrument may be enhanced if the components are replaceable either for a maintenance purpose or for a reconfiguration purpose. In the maintenance case, some of the information transferred to the instrument controller could include expected lifetime or periodic maintenance, such that the master controller would know when to ask for component maintenance. In the set-up or configuration case, the ID code might initialize a set of reprogramming instructions that might include: 1) redefinition of the motor drive parameters for the actuator (useful for change of speed or torque) and 2) redefinition of the sensor outputs (useful for a change in angular position of the actuator). Thus the novel application would be to employ a type of coding to signal the master controller the properties and capabilities of that particular configuration.

Those skilled in art will appreciate that other possible modes of system operation can accomplish the essentially same liquid dispensing tasks. Moreover, although only a few embodiments of the present inventions have been described in detail, it should be understood that the present inventions might be embodied in many other specific forms without departing from the spirit or scope of the inventions.

What is claimed is:

1. A multi-position micro-fluidic valve system having a drive motor, said comprising:
   an actuator assembly including a housing and a drive shaft rotatably disposed in said housing for rotational displacement about a drive axis thereof, said housing includes a first bearing race portion defining a central passage therethrough;
   a carrier platform at a proximal portion of the drive shaft, said carrier platform being configured to operably couple to said drive motor for selective rotation of said drive shaft about said drive axis;
   one of at least two different multi-position fluid valve devices each configured for rotational movement of a corresponding valve shaft about a valve rotational axis thereof between a plurality of discrete fluid distribution positions;
   a coupling device configured to selectively, removably mount the valve shaft of the respective valve device to the drive shaft of the actuator assembly to enable selective positioning of the multi-position fluid valve device at a discrete one of said plurality for discrete distribution positions; and
   an encoder spool device disposed in said housing and including a second bearing race portion oriented opposite said first bearing race portion, and said encoder spool device defining a central port formed and dimensioned for friction fit receipt of said drive shaft therethrough such that when carrier platform is positioned on an opposite side of the first bearing race portion of the housing, and said drive shaft is friction fit to said encoder spool such that said first bearing race portion is sandwiched between said second bearing race portion of said encoder spool and said carrier platform of said drive shaft to provide rotational support of said drive shaft relative said housing.

2. The micro-fluidic valve system as defined by claim 1, further including:
   a gear train assembly operably disposed between said drive motor and said carrier.

3. The micro-fluidic valve system as defined by claim 1, wherein
   said actuator assembly including a plurality of ball bearings disposed between said first bearing race portion of housing and the second bearing race portion of said encoder spool to facilitate said rotational support.

4. The micro-fluidic valve system as defined by claim 3, wherein
   said ball bearings, said first bearing race portion and said second bearing race portion are all composed a high strength composite material with encapsulated lubricants.

5. The micro-fluidic valve system as defined by claim 1, wherein
   said drive shaft includes a plurality of splines extending radially outward from said drive axis, and
   said central port of said encoder spool device is formed and dimensioned for sliding frictional receipt of the plurality of splines axially therethrough such that a distal end of said drive shaft protrudes into a receiving socket of said encoder spool device.

6. The micro-fluidic valve system as defined by claim 5, wherein
   the respective coupling device includes a coupler member strategically affixed to said valve shaft of the corresponding valve device for rotation about the valve rotation axis, said coupling device defining a receiving slot formed and dimensioned for sliding frictional receipt of the plurality of splines of said drive shaft axially therein.

7. The micro-fluidic valve system as defined by claim 6, wherein
   said coupler member is formed and dimensioned for sliding receipt in said receiving socket of the encoder spool device when said drive shaft is received in said receiving slot of the coupler member.

8. The micro-fluidic valve system as defined by claim 7, further including:
   a coupler key mechanism configured to cooperate between the coupler member and the encoder spool device for aligned orientation of the coupler member relative the encoder spool device.

9. The micro-fluidic valve system as defined by claim 6, wherein
   said drive axis and said valve rotational axis are substantially co-axial.

10. The micro-fluidic valve system as defined by claim 7, wherein
   said housing of the actuator assembly includes a barrel portion formed and dimensioned for sliding receipt of at least a portion of the corresponding valve device therein for mounting thereto when said drive shaft is received in said receiving slot of the coupler member.

11. The micro-fluidic valve system as defined by claim 10, further including:
a coupler key mechanism configured to cooperate between the coupler member and the encoder spool device for aligned orientation of the coupler member relative the encoder spool device; and
a valve key mechanism configured to cooperate between the valve device and the actuator assembly for aligned orientation of the valve device relative the actuator assembly.

12. The micro-fluidic valve system as defined by claim 1, wherein
one of the multi-position fluid valve devices is a 6 position rotary valve, and the other of the multi-position valve devices is a 10 position rotary valve.

13. The micro-fluidic valve system as defined by claim 1, further including:
a valve identification device configured to facilitate identification of the type of valve device that is removably mounted to the actuator assembly.

14. The micro-fluidic valve system as defined by claim 1, further including:
said valve sensing device includes RFID technology.

15. The micro-fluidic valve system as defined by claim 1, further including:
a sensor assembly cooperating with one of the drive shaft and the valve shaft to effect alignment of the respective valve device in a discrete one position of the plurality of positions thereof.

16. The micro-fluidic valve system as defined by claim 15, wherein
said sensor assembly includes one or more encoder wheels strategically coupled to said drive shaft for rotation thereof about the drive axis.

17. The micro-fluidic valve system as defined by claim a 16, wherein
said sensor assembly includes one or more sensors cooperating with the one or more encoder wheels, relative to said drive shaft, to position said respective valve device in said discrete one position of the plurality of positions thereof.

18. The micro-fluidic valve system as defined by claim 1, further including:
a sensor assembly cooperating with the drive shaft of the actuator assembly to enable positioning of the respective valve device in a discrete one position of the plurality of positions thereof.

19. The micro-fluidic valve system as defined by claim 18, wherein
said sensor assembly includes one or more encoder wheels strategically mounted to the encoder spool for rotation thereof about the drive axis.

20. A micro-fluidic valve actuator assembly configured to removably mate to one of at least two different multi-position micro-fluidic valve devices, each said valve device including a coupler member for mounting operation of the respective valve device for displacement about a position axis to operably switch the one valve device to a discrete one position of the plurality of positions thereof, said actuator assembly comprising:
a drive motor;
a housing defining a central through-chamber, and having a first bearing race portion extending into said through-chamber and forming a central passage portion thereof;
a drive assembly having a drive shaft with a distal end thereof configured to removably mate with the coupler member of the valve device for operable displacement about said position axis, and an opposite proximal portion having a carrier platform that is configured to operably couple to said drive motor to rotatably drive said drive assembly about a drive axis;
a plurality of ball bearing disposed in the first bearing race portion of the housing; and
an encoder spool device disposed in said through-chamber and including a second bearing race portion oriented opposite said first bearing race portion in a manner sandwiching said plurality of ball bearings therebetween, and said encoder spool device defining a central port formed and dimensioned for friction fit receipt of said drive shaft therethrough such that when said carrier platform is positioned on an opposite side of the first bearing race portion of the housing, and said drive shaft is friction fit to said encoder spool, said first bearing race portion is sandwiched between said second bearing race portion of said encoder spool and said carrier platform of said drive shaft to provide rotational support of said drive shaft and said encoder spool device relative said housing.

21. The micro-fluidic actuator assembly as defined by claim 20, further including:
a gear train assembly operably disposed between said drive motor and said carrier.

22. The micro-fluidic actuator assembly as defined by claim 20, further including:
one or more encoder wheels strategically coupled to said encoder spool device for rotation thereof about the drive axis, and
one or more sensors cooperating with the one or more encoder wheels, relative said drive shaft, to effect alignment of the respective valve device in said discrete one position of the plurality of positions thereof.

23. The micro-fluidic actuator assembly as defined by claim 20, wherein
said ball bearings, said first bearing race portion and said second bearing race portion are all composed of a high strength composite material with encapsulated lubricants.

24. The micro-fluidic actuator assembly as defined by claim 20, wherein
said drive shaft includes a plurality of splines extending generally radially outward from said drive axis, and
said central port of said encoder spool device is formed and dimensioned for sliding frictional receipt of the plurality of splines axially therethrough such that a distal end of said drive shaft protrudes into a receiving socket of said encoder spool device.

25. The micro-fluidic actuator assembly as defined by claim 24, further including:
a coupler key mechanism configured to cooperate between the coupler member and the encoder spool device for aligned orientation of the coupler member relative the encoder spool device.

26. The micro-fluidic actuator assembly as defined by claim 20, wherein
said housing of the actuator assembly includes a barrel portion formed and dimensioned for sliding receipt of at least a portion of the corresponding valve device therein for mounting thereto when said drive shaft is received in said receiving slot of the coupler member.

27. The micro-fluidic actuator assembly as defined by claim 26, further including:

a coupler key mechanism configured to cooperate between the coupler member and the encoder spool device for aligned orientation of the coupler member relative the encoder spool device; and a valve key mechanism configured to cooperate between the valve device and the actuator assembly for aligned orientation of the valve device relative the actuator assembly.

28. The micro-fluidic actuator assembly as defined by claim 20, further including:

a valve identification device configured to facilitate automated identification of the type of valve device that is removably mounted to the actuator assembly.

* * * * *